United States Patent [19]

Okita et al.

[11] Patent Number: 4,699,844

[45] Date of Patent: * Oct. 13, 1987

[54] MAGNETIC RECORDING MEDIUM

[75] Inventors: Tsutomu Okita; Nobuo Tsuji; Yoshito Mukaida, all of Kanagawa, Japan

[73] Assignee: Fuji Photo Film Co., Ltd., Kanagawa, Japan

[*] Notice: The portion of the term of this patent subsequent to Mar. 18, 2003 has been disclaimed.

[21] Appl. No.: 598,097

[22] Filed: Apr. 9, 1984

[30] Foreign Application Priority Data

Apr. 7, 1983 [JP] Japan .................................. 58-61288

[51] Int. Cl.$^4$ .............................................. G11B 5/702
[52] U.S. Cl. ............................. 428/425.9; 252/62.54; 427/44; 427/128; 427/130; 427/131; 428/522; 428/694; 428/695; 428/900
[58] Field of Search ............ 428/694, 695, 900, 425.9, 428/522, 336; 427/44, 130, 131, 128; 360/134–136; 252/62.54

[56] References Cited

U.S. PATENT DOCUMENTS

| | | | |
|---|---|---|---|
| 4,004,997 | 1/1977 | Tsukamoto | 428/329 |
| 4,407,853 | 10/1983 | Okita | 427/128 |
| 4,419,406 | 12/1983 | Isoke | 428/900 |
| 4,428,974 | 1/1984 | Okita | 427/128 |
| 4,448,848 | 5/1984 | Okita | 427/44 |

FOREIGN PATENT DOCUMENTS 128711 8/1982 Japan .................................. 427/44

*Primary Examiner*—Ellis P. Robinson
*Attorney, Agent, or Firm*—Sughrue, Mion, Zinn, Macpeak & Seas

[57] ABSTRACT

A magnetic recording medium comprised of a support base having a magnetic recording provided thereon is disclosed. The recording layer is comprised of ferromagnetic particles dispersed in a binder. The binder includes (1) a vinyl chloride-vinyl alkanoate type copolymer containing —$CO_2H$ group of $5 \times 10^{-5}$ to $1.7 \times 10^{-3}$ equivalent per g of the polymer, (2) urethane acrylate having a molecular weight in the range of from 20,000 to 300,000, and (3) a compound having at least two (meth)acryloyl groups in the molecule and having a molecular weight of 600 or less. The magnetic recording layer is irradiated with electron beams in order to harden the binder. The resulting medium has excellent electromagnetic properties and the magnetic coating composition prepared for making the magnetic recording layer has excellent stability during storage.

8 Claims, No Drawings

MAGNETIC RECORDING MEDIUM

BACKGROUND OF THE INVENTION

The present invention relates to a magnetic recording medium such as a video tape, an audio tape or a computer tape.

At present, thermoplastic resins such as a vinyl chloride and vinyl acetate resin, a vinyl chloride and vinylidene chloride resin, a cellulose resin, an acetal resin, a urethane resin, or an acrylonitrile butadiene resin as described in, for example, U.S. Pat. Nos. 3,634,137, 4,238,548 and 4,307,154 have been used alone or in combination as a binder for commonly used magnetic recording media. However, magnetic recording layers containing these binders are not necessarily satisfactory since the wear resistance of the magnetic recording layers is low and the tape path of the magnetic tapes tends to be easily stained.

In conventional magnetic recording media, thermosetting resins such as a melamine resin or an urea resin have been used, and binders which are cross-linked by a chemical reaction such as an isocyanate compound or an epoxy compound have been added to the above-described thermosetting resins as described in, for example, U.S. Pat. Nos. 4,049,871, 4,154,895 and 4,333,988. However, with the above-described cross-linkable binders, storage stability of the resin solution in which magnetic particles are dispersed is generally poor. That is, pot life is short, physical properties of a magnetic coating composition can not be maintained homogeneous, homogeneous properties of magnetic tapes can not be maintained, a heat treatment step is required to cure the coated layer after coating a magnetic coating composition and drying it thereby requiring a long period of time for manufacturing the magnetic recording medium.

In order to eliminate the above defects, a method has been proposed in which a magnetic recording medium is prepared by using an oligomer and a monomer of an acrylate type as binders and the binder is hardened with electron beam radiation after drying, as disclosed in Japanese Patent Publication No. 12423/72, Japanese Patent Publication (Unexamined) Nos. 13639/72, 15104/72 and 77433/75. Also, a method has been proposed where thermoplastic resins and resins curable with electron beam radiation, and U.S. Pat. Nos. 3,871,908, 4,004,997 and 4,343,861 are used in combination as binders as disclosed in Japanese Patent Publication (Unexamined) Nos. 25231/81, 86130/82, 86131/82, 127926/82 and 162125/82.

In recent years, a support for magnetic layers has been made thinner for long time recording and, thus, the physical strength of the magnetic layer needed to be improved. In addition, video cassette recorders have come to have multi-functions, and video recording tapes are required to withstand use under severe conditions. However, it has been impossible to prepare a magnetic recording medium having high electromagnetic properties and running durability in accordance with the above described prior arts. That is, with conventional binders, the dispersion of ferromagnetic particles has poor stability which, in turn, deteriorates electromagnetic properties as well as running durability of the magnetic recording medium prepared from the dispersion.

SUMMARY OF THE INVENTION

A primary object of the present invention is to provide a magnetic recording medium having excellent electromagnetic properties.

Another object of the invention is to provide a magnetic recording medium having a magnetic coating composition having excellent stability of the dispersion.

A further object of the present invention is to provide a magnetic recording medium having an excellent head touch.

A still further object of the present invention is to provide a magnetic recording medium having excellent wear resistance.

Yet a further object of the present invention is to provide a magnetic recording medium prepared without heat treatment which is generally required for curing the magnetic coating layer.

As a result of extensive researches, it has been found that the above-described disadvantages involved in the conventional methods using thermoplastic resins or thermosetting resins, using a binder which is cross-linked by a chemical reaction, or using a curable binder cured with an electron beam can be eliminated using a binder composed of (1) a copolymer of vinyl chloride and vinyl acetate containing $CO_2H$ group, (2) a high molecular weight urethane acrylate and (3) a (meth)acrylate monomer containing at least two (meth)acryloyl groups in the molecule thereof, and irradiating the magnetic recording layer with an electron beam.

The present invention is based on the above findings and provides a magnetic recording medium containing as a binder (1) a vinyl chloride-vinyl alkanoate type copolymer having from $5 \times 10^{-5}$ to $1.7 \times 10^{-3}$ equivalent of $-CO_2H$ group per g of the polymer, (2) urethane acrylate having a molecular weight in the range of from 20,000 to 300,000 and (3) a compound having a molecular weight of from 200 to 600 and having at least two (meth)acryloyl groups in the molecule, and the magnetic recording medium being irradiated with an electron beam.

In the present invention, electromagnetic properties are greatly improved by the synergistic effect of these resins and thus a magnetic recording medium having excellent running properties and durability can be obtained. It is believed that such excellent results are the result of less curling of the magnetic recording tape with respect to the head which used to be a serious defect when conventional electron beam curable binder were used.

DETAILED DESCRIPTION OF THE INVENTION

Specific examples of the component (1) include a vinyl chloride-vinyl acetate-maleic acid copolymer, a vinyl chloride-vinyl acetate-fumaric acid copolymer and a vinyl chloride-vinyl propionate-maleic acid copolymer, preferably a vinyl chloride-vinyl acetate-maleic acid copolymer. The vinyl chloride-vinyl alkanoate type copolymer preferably contains $-CO_2H$ group in an amount of from $5 \times 10^{-5}$ to $1.7 \times 10^{-3}$ equivalent, more preferably from $3 \times 10^{-4}$ to $1 \times 10^{-3}$ equivalent, per g of the polymer. Outside the above range, electromagnetic properties markedly deteriorate.

Component (2) includes polyether type, polyester type or polyester polyether type urethane resins whose terminal or pendant OH groups are acrylate-modified OH groups. The urethane resins contain one or more acryloyl groups, and preferably 2 acryloyl groups.

Component (2) has a molecular weight of from 20,000 to 300,000, preferably from 30,000 to 200,000. The molecular weight referred to herein is a value which is measured by liquid chromatogram and is compared with a standard polystyrene. If the molecular weight is lower than 20,000, stability of the dispersion of a magnetic coating composition decreases and electromagnetic properties are also deteriorated. If the molecular weight is higher than 300,000, resins do not easily dissolve into an organic solvent and a homogeneous magnetic coating composition can not be obtained.

Component (3) includes a compound having a molecular weight of from 200 to 600, preferably from 300 to 600, and having at least two (meth)acryloyl groups, preferably from 2 to 4 (meth)acryloyl groups in the molecule. The term "(meth)acryloyl" as used herein is referred to acryloyl or methacryloyl or both of them. Those compounds having acryloyl groups are preferred since acryloyl is more reactive than methacryloyl and providing superior curability.

Specific examples of Component (3) include poly(meth)acrylate esters of polyethylene glycol such as ethylene glycol, diethylene glycol, triethylene glycol or tetraethylene glycol; and poly(meth)acrylate esters of polyhydric alcohols such as butanediol, hexanediol, trimethylolpropane, glycerine, pentaerythriol, dipentaerythritol, cyclohexanediol, cyclohexane-1,4-dimethanol, 2,5-dihydroxytoluene, p,p'-biphenol, 2,2'-diphenyl-1,3-propanediol, 2,2'-bis(4-hydroxyethoxyphenyl)propane or 2,2'-bis(4-hydroxypolyethoxyphenyl)propane. Diethylene glycol diacrylate, triethylene glycol diacrylate, trimethylolpropane triacrylate, 1,4-diacryloylcyclohexane, dipentaerythritol tetraacrylate, diethylene glycol dimethacrylate, triethylene glycol dimethacrylate and dipentaerythritol tetramethacrylate are particularly preferred.

If the molecular weight is more than 600, the crosslinking degree after electron beam radiation is degraded. Components (3) can be used alone or in combination with each other.

In addition to the foregoing binder components (1) to (3), the binder composition may further contain a compound having one unsaturated carbon-carbon bond in its molecule and being capable of being polymerized with an electron beam. Preferably, the unsaturated compounds have about 3 to about 20 carbon atoms. Examples of the compounds include acrylic acid, itaconic acid, methyl acrylate and its alkyl homologues (alkyl acrylates), styrene and its homologues such as α-methylstyrene and β-chlorostyrene, acrylonitrile, acrylamide, vinyl acetate, vinyl propionate, N-vinylpyrrolidone, etc. Those compounds described in *Kankosei Jushi Data Shu* (Collection of Data on Photosensitive Resins) published by Kabushiki Kaisha Sogo Kagaku Kenkyusho, pp. 235–236 (December 1968) can also be used. The amount of the unsaturated compound which can be used is 15% or less based on the total weight of the binder.

Preferred range of the ratio of the component (2) to component (3) is from 40/60 to 95/5, and preferably from 50/50 to 85/15 (parts by weight).

Preferred range of the the ratio of component (1) to the total amount of the components (2) and (3) is from 30/70 to 80/20 and more preferably from 40/60 to 70/30. The lower the proportion of the component (1) the lower the dispersibility of the magnetic particles, and the higher the proportion of the component (1) the lower the running durability. On the other hand, the lower the proportion of the component (2) or the higher the proportion of the component (3), the lower the running durability. Further, the higher the proportion of the component (2) or the lower the proportion of the component (3), the less hardening of the coated layer proceeds, thus leading to lower running durability.

Ferromagnetic powders that can be used in the present invention include ferromagnetic iron oxide fine powders, Co-doped ferromagnetic iron oxide fine powders, ferromagnetic chromium dioxide fine powders, ferromagnetic alloy fine powders, barium ferrite and son on. Effective ferromagnetic iron oxide and chromium dioxide have an acicular ratio of from about 2/1 to about 20/1, preferably not less than 5/1, and an average length of from about 0.2 to about 2.0 μm. The ferromagnetic alloy fine powders generally have a metal content of not less than 75 wt %, with 80 wt % or more of the metal content being a ferromagnetic metal, i.e., Fe, Co, Ni, Fe-Co, Fe-Ni or Fe-Co-Ni, and have a longer diameter of not more than about 1.0 μm. These acicular ferromagnetic powders are described in, for example, U.S. Pat. Nos. 3,026,215, 3,031,341, 3,100,194, 3,242,005 and 3,389,014.

Organic solvents which can be used for the magnetic coating composition include ketones, e.g., acetone, methyl ethyl ketone, methyl isobutyl ketone, cyclohexanone, etc.; esters, e.g., methyl acetate, ethyl acetate, butyl acetate, monoethyl ether glycol acetate, etc.; ethers, e.g., diethyl ether, tetrahydrofuran, glycol dimethyl ether, glycol monoethyl ether, dioxane, etc.; aromatic hydrocarbons, e.g., benzene, toluene, xylene, etc.; chlorinated hydrocarbons, e.g., methylene chloride, ethylene chloride, carbon tetrachloride, chloroform, ethyl chlorohydrin, dichlorobenzene, etc.; and the like. Of these, methyl ethyl ketone, methyl isobutyl ketone, cyclohexanone, ethyl acetate, butyl acetate, tetrahydrofuran, toluene, xylene, etc. are preferred.

The magnetic coating composition of the present invention may further contain additives such as a lubricant, an abrasive, a dispersing agent, an antistatic agent and a rust inhibitor. The lubricant includes saturated or unsaturated higher fatty acids such as lauric acid, myristic acid, stearic acid, eicosanoic acid, oleic acid, rinolic acid, erucic acid, etc., higher fatty acid esters such as butyl laurate, hexyl laurate, ethyl myristate, butyl myristate, ethyl stearate, butyl stearate, ethyl oleate, butyl oleate, etc., higher fatty acid amides such as laurylamide, myristylamide, stearylamide, etc., higher alcohols such as stearyl alcohol, myristyl alcohol, etc., silicone oil, higher fatty acid-modified silicones, mineral oils, edible oils such as whale oil, shark oil, rape oil, soybean oil, etc. and fluorine type compounds. By the term "higher" as used herein it is meant that 10 or more, preferably 12 or more carbon atoms are contained.

The abrasive includes $Cr_2O_3$, $\alpha\text{-}Al_2O_3$, carborundum, garnet, emery, etc.

The dispersing agent includes nonionic surfactants such as alkylene oxide derivatives, glycerol derivatives, glycidol derivatives, etc., cationic surfactants such as higher alkylamines, quaternary ammonium salts, phosphoniums, sulfoniums, etc., anionic surfactants such as carboxylic acids, sulfonic acids, phosphoric acid, etc., amphoteric surfactants such as amino acids, aminosulfonic acids, etc., coupling agents such as silane coupling agents, titanium coupling agents, etc.

The antistatic agent includes carbon black, carbon black graft polymers, and the compounds described above as the dispersing agent.

These additives may be added when the coating composition is prepared. The lubricant may also be coated or sprayed on the surface of a magnetic layer either as they are or as dissolved in an organic solvent after drying, smoothing the magnetic layer or curing the magnetic layer with electron beam radiation.

Materials for the support on which the magnetic coating composition is coated include polyesters, e.g., polyethylene terphthalate, polyethylene-2,6-naphthalate, etc.; polyolefines, e.g., polyethylene, polypropylene, etc.; cellulose derivatives, e.g., cellulose triacetate, etc.; plastics, e.g., polycarbonate, polyimide, polyamide-imide, etc.; non-magnetic metals that are used if desired, e.g., aluminum, copper, tin, zinc, or a non-magnetic alloy including these metals; plastics on which a metal, e.g., aluminum, is deposited; paper or paper coated or laminated with polyolefins; and so on. Of these, polyethylene terephthalate, polyethylene-2,6-naphthalate, polyimides, etc. are preferred.

The non-magnetic support may be in the form of a film, a tape, a sheet, a disc, a card or a drum, and various materials can be selected according to the final use.

A backcoat as described in, for example, U.S. Pat. Nos. 3,041,196, 3,166,688, 3,293,066, 3,617,378, 3,761,311, etc. can be provided on the support on the opposite side of the magnetic layer for the purpose of preventing charging, transferring and wow flutter, improving the strength of the magnetic recording medium and for making the back side of the support matted.

A scanning method, a double scanning method, a curtain beam method or a broad beam curtain method as described in, for example, U.S. Pat. Nos. 3,702,412, 3,745,396, 3,769,600, 3,848,153, 4,252,413, etc. can be used for accelerating electron beams.

The electron beam used has an accelerating voltage of from 100 to 1000 KV, preferably from 150 to 300 KV. The absorption dose is from 1 to 20 megarads, preferably 3 to 15 megarads. If the accelerating voltage is less than 100 KV, the transmitted amount of energy is insufficient and, if it exceeds 1000 KV, the energy efficiency used for polymerization is lowered, making the process uneconomical. If the absorption dose is less than 1 megarad, the curing reaction is insufficient for obtaining a magnetic layer having a satisfactory mechanical strength and, if the absorption dose is more than 20 megarad, the energy efficiency used for curing is lowered or a radiated object generates heat and the support, particularly a plastic support, may be deformed.

The present invention will now be illustrated in greater detail by way of the following examples and comparative examples. However, the scope of the invention is not to be construed as being limited to these examples. In these examples, all parts are by weight unless otherwise indicated.

| EXAMPLE 1 | |
|---|---|
| $\gamma\text{-Fe}_2\text{O}_3$ | 400 parts |
| Vinyl chloride-vinyl acetate-maleic acid copolymer (—COOH group of $1.5 \times 10^{-4}$ equivalent per 1 g of the resin) | 45 parts |
| Urethane acrylate (Polyester polyol which was a condensation product of adipic acid-butanediol-tolylene diisocyanate was modified by tolylene diisocyanate and reacted with 2-hydroxyethyl acrylate. Molecular weight: | 45 parts |

| -continued | |
|---|---|
| EXAMPLE 1 | |
| 50,000) | |
| Trimethylolpropane triacrylate | 10 parts |
| Lecithin | 4 parts |
| Stearic acid | 4 parts |
| Butyl stearate | 4 parts |
| Carbon black | 10 parts |
| $\alpha\text{-Al}_2\text{O}_3$ | 5 parts |
| Methyl ethyl ketone | 1000 parts |

The above composition was mixed and kneaded in a ball mill for 50 hours to prepare a magnetic coating composition which was then coated by a doctor blade coating method in a dry thickness of $5\mu$ on a polyethylene terephthalate support having a thickness of $15\mu$. The magnetic recording layer thus obtained was subjected to magnetic orientation by cobalt magnets and the solvent was evaporated (at 100° C. for 1 minute). Then, smoothing treatment was conducted by calender rolls composed of five pairs of rolls, each pair comprising a cotton roll and a mirror roll (roll temperature: 60° C.). An electron beam having an accelerating voltage of 200 kV and a beam current of 10 mA was irradiated so that the magnetic layer received an absorption dose of 10 Mrad. The resulting sample was identified as Sample No. 1.

Sample Nos. 2 to 6 were prepared in the same manner as described in Example 1 except that the following composition for a binder was used respectively.

| COMPARATIVE EXAMPLE 1 (Sample No. 2) | |
|---|---|
| Vinyl chloride-vinyl acetate-maleic acid copolymer as used in Example 1 | 45 parts |
| Urethane acrylate (same as that used in Example 1; molecular weight: 5,000) | 45 parts |
| Trimethylolpropane triacrylate | 10 parts |
| COMPARATIVE EXAMPLE 2 (Sample No. 3) | |
| Vinyl chloride-vinyl acetate-vinyl alcohol copolymer | 45 parts |
| Urethane acrylate (same as that used in Example 1) | 45 parts |
| Trimethylolpropane triacrylate | 10 parts |
| COMPARATIVE EXAMPLE 3 (Sample No. 4) | |
| Vinyl chloride-vinyl acetate-maleic acid copolymer (same as that used in Example 1) | 50 parts |
| Urethane acrylate as in Example 1 | 50 parts |
| EXAMPLE 2 (Sample No. 5) | |
| Vinyl chloride-vinyl acetate-maleic acid copolymer (—COOH group of $8 \times 10^{-4}$ equivalent per 1 g of the resin) | 30 parts |
| Urethane acrylate (Polyester polyol composed of sebasic acid butanediol and diphenylmethane diisocyanate was acrylated in the same manner as in Example 1. Molecular weight: 100,000) | 60 parts |
| Dipentaerythritol tetraacrylate | 10 parts |
| EXAMPLE 3 (Sample No. 6) | |
| Vinyl chloride-vinyl acetate-maleic acid copolymer (same as that used in Example 1) | 60 parts |
| Urethane acrylate (same as that used in Example 2) | 32 parts |
| Trimethylolpropane triacrylate | 8 parts |

The following tests were conducted with respect to Sample Nos. 1 to 6 and the results obtained are shown in the Table below.

DISPERSION STABILITY OF MAGNETIC COATING COMPOSITION

The magnetic coating composition was allowed to stand for 24 hours at 30° C. and the state of the composition was visually observed.

ELECTROMAGNETIC PROPERTIES AND RUNNING DURABILITY

A grey signal (50% set-up) was recorded on the magnetic tapes (Sample Nos. 1 to 6) using a VTR ("NV 8200" manufactured by Matsushita Electric Industries, Ltd.) and noise was measured by a S/N meter (Type "925 C" manufactured by Shibasoku Co., Ltd.). Each of the video sensitivity and the video S/N was indicated in terms of a relative value as compared with that of Sample No. 1 which is referred to as 0 dB. The running durability was shown in terms of the decrease in output after 100 runs as compared with the initial output of each sample which is referred to as 0 dB.

TABLE

| Sample No. | Dispersion Stability | Video Sensitivity | Video S/N | Running Durability |
|---|---|---|---|---|
| 1 | No change | 0.0 dB | 0.0 dB | −0.3 dB |
| 2 | The composition was separated into two phases of solutions. | −1.0 dB | −1.5 dB | −2.0 dB |
| 3 | No change | −2.0 dB | −2.0 dB | −1.0 dB |
| 4 | No change | −0.1 dB | −0.3 dB | −3.5 dB |
| 5 | No change | +0.1 dB | +0.3 dB | +0.1 dB |
| 6 | No change | +0.1 dB | −0.1 dB | +0.2 dB |

As is apparent from the results shown in the Table, the magnetic recording media according to the present invention (Sample Nos. 1, 5 and 6) show much better electromagnetic properties and running durability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
    a support having coated thereon;
    a magnetic recording layer, the magnetic recording layer comprised of ferromagnetic particles dispersed in a binder comprised of:
    (1) a vinyl chloride-vinyl alkanoate type copolymer containing —$CO_2H$ group of from $5 \times 10^{-5}$ to $1.7 \times 10^{-3}$ equivalent per g of the polymer;
    (2) a urethane acrylate having a molecular weight in the range of from 20,000 to 300,000; and
    (3) a compound having at least two (meth)acryloyl groups in the molecule and having a molecular weight of from 200 to 600, the magnetic recording layer having been radiated with an electron beam, wherein the ratio by weight of the urethane acrylate (2) to the compound (3) is in the range of from 40:60 to 95:5 and wherein the ratio by weight of the polymer (1) to the total amount of components (2) and (3) is in the range of from 30:70 to 80:20.

2. A magnetic recording medium as claimed in claim 1, wherein the vinyl chloride-vinyl alkanoate polymer (1) contains a —$CO_2H$ group in an amount of from $3 \times 10^{-4}$ to $1 \times 10^{-3}$ equivalent per g of the polymer.

3. A magnetic recording medium as claimed in claim 1, wherein the urethane acrylate (2) is a compound which includes OH groups at the terminals and side chains which are acrylate modified.

4. A magnetic recording medium as claimed in claim 1, wherein the urethane acrylate has a molecular weight in the range of from 30,000 to 200,000.

5. A magnetic recording medium as claimed in claim 1, wherein the magnetic recording layer was irradiated with an electron beam having an acceleration voltage of from 100 to 1,000 KV to apply an absorption dose of from 1 to 20 megarads.

6. A magnetic recording medium as claimed in claim 1, wherein the ratio by weight of the urethane acrylate (2) to the compound (3) is in the range of from 50:50 to 85:15.

7. A magnetic recording medium as claimed in claim 1, further comprising:
    a back coat layer provided on the support on a side opposite the side having the magnetic recording layer thereon.

8. A magnetic recording medium as claimed in claim 6, wherein the ratio by weight of the polymer (1) to the total amount of components (2) an (3) is in the range of from 40:60 to 70:30.

* * * * *